(12) United States Patent
Moses et al.

(10) Patent No.: US 9,075,473 B2
(45) Date of Patent: Jul. 7, 2015

(54) INTERACTIVE DISPLAY WITH REMOVABLE FRONT PANEL

(71) Applicant: QUALCOMM Incorporated, San Diego, CA (US)

(72) Inventors: Daniel Moses, San Diego, CA (US); Robert Mitchell Kleiman, San Diego, CA (US); Sergiu Radu Goma, San Diego, CA (US); Milivoje Aleksic, San Diego, CA (US); Sergio Lopez, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 177 days.

(21) Appl. No.: 13/779,429

(22) Filed: Feb. 27, 2013

(65) Prior Publication Data

US 2014/0111448 A1    Apr. 24, 2014

Related U.S. Application Data

(60) Provisional application No. 61/716,280, filed on Oct. 19, 2012, provisional application No. 61/749,184, filed on Jan. 4, 2013.

(51) Int. Cl.
*G06F 3/041* (2006.01)
*G06F 1/16* (2006.01)

(52) U.S. Cl.
CPC ............ *G06F 3/0414* (2013.01); *G06F 1/1601* (2013.01)

(58) Field of Classification Search
CPC ....... G06F 3/046; G06F 3/041; G06F 3/0412; G06F 3/0414

USPC .................................................. 345/173, 174
See application file for complete search history.

(56) References Cited

U.S. PATENT DOCUMENTS

| 8,138,869 | B1 | 3/2012 | Lauder et al. |
|---|---|---|---|
| 8,235,208 | B2 | 8/2012 | Sirichai et al. |
| 8,274,495 | B2 | 9/2012 | Lee |
| 2002/0149905 | A1 | 10/2002 | Jackson |
| 2002/0154099 | A1 | 10/2002 | Oh |
| 2004/0125086 | A1 | 7/2004 | Hagermoser et al. |

(Continued)

FOREIGN PATENT DOCUMENTS

| JP | 2005332063 A | 12/2005 |
|---|---|---|
| TW | I363986 B | 5/2012 |

OTHER PUBLICATIONS

International Search Report and Written Opinion—PCT/US2013/062699—ISA/EPO—Jul. 9, 2014.

(Continued)

*Primary Examiner* — Regina Liang
(74) *Attorney, Agent, or Firm* — Knobbe Martens Olson & Bear LLP

(57) ABSTRACT

Systems and apparatus for a touch sensitive display device are disclosed. The display device may include a detachable transparent front panel which overlays a display panel. The detachable transparent front panel may be held against the display panel and a plurality of pressure sensors by a series of magnets. This allows the front panel to act as an interactive touch display system. By having a detachable transparent front panel, the touch sensitive display device may be placed in messy environments, such as a kitchen. A user can then remove and wash the detachable transparent front panel without harming any electronic components.

20 Claims, 7 Drawing Sheets

(56) References Cited

U.S. PATENT DOCUMENTS

| | | |
|---|---|---|
| 2005/0073506 A1 | 4/2005 | Durso |
| 2006/0073891 A1* | 4/2006 | Holt |
| 2008/0259046 A1* | 10/2008 | Carsanaro .................... 345/173 |
| 2010/0128490 A1* | 5/2010 | Shiu |
| 2010/0302174 A1 | 12/2010 | Cornell et al. |
| 2011/0175845 A1 | 7/2011 | Honda et al. |
| 2011/0298935 A1* | 12/2011 | Segal |
| 2012/0050969 A1* | 3/2012 | Crohas |
| 2014/0085796 A1* | 3/2014 | Mathew et al. |

OTHER PUBLICATIONS

Partial International Search Report—PCT/US2013/062699—ISA/EPO—Apr. 24, 2014.

* cited by examiner

INTERACTIVE DISPLAY WITH REMOVABLE FRONT PANEL

CROSS-REFERENCE TO RELATED APPLICATIONS

The application claims the priority benefit of U.S. Provisional Application No. 61/716,280, entitled "INTERACTIVE DISPLAY WITH REMOVABLE FRONT COVER," filed Oct. 19, 2012, and U.S. Provisional Application No. 61/749,184, entitled "INTERACTIVE DISPLAY WITH REMOVABLE FRONT PANEL," filed Jan. 4, 2013, the entireties of which are incorporated herein by reference.

TECHNICAL FIELD

The systems and methods disclosed herein relate generally to display devices, and more particularly, to touch-sensitive display devices.

BACKGROUND

Many people consume media content and use touchscreen devices while also performing other activities, for example watching television or browsing the internet for a recipe while cooking in the kitchen. In particular, use of a touchscreen device in the kitchen includes several considerations, such as size of the display, angle of the display for ease of viewing while standing, and ease of cleaning the device.

In some configurations, the size of a display in the kitchen environment should be large enough for a user to see at a distance but small enough to fit within the space limitations of a kitchen. Some displays are therefore between the size of a tablet computer and the size of a television screen. Further, in order for a user to be able to read a recipe off the display, for example, the display is normally used fairly proximate to the user who may be cooking or performing other tasks which may cause their hands to be dirty or soiled. A display device located in this environment may easily become dirty through cooking splatters or by being touched by a user with food residue on his fingers.

Additionally, conventional touchscreen devices incorporate capacitive touchscreen displays. When a user touches the display of a capacitive touchscreen, distortion of the screen's electrostatic field results, which is measurable as a change in capacitance. The display of a capacitive touchscreen device typically is not removable. Such touchscreens typically have a bezel that surrounds the front panel to attach the panel to the device. Debris may become trapped behind the bezel of the display. Such touchscreens therefore are more difficult to keep clean in messy environments, such as a kitchen.

SUMMARY

In order to address these considerations, embodiments of a display device described herein have a detachable front panel, which in some embodiments also provides interactive touch sensing. Interactive touch sensing may be accomplished through the use of a plurality of pressure sensors mounted on the frame of the display device. The pressures sensors can sense the pressure of a user's touch on the front panel of the display device. A control module can identify the location and type of gesture made by a user and correlate this information to perform a predetermined command based on the identified user gesture.

Some embodiments of the detachable front panel may comprise bezel-less glass. In environments where the display device is exposed to dirt or grease, the lack of bezel provides the benefit of preventing dirt or grease from collecting at contact lines between the bezel and the glass, which can be difficult to clean. The detachable nature of the front panel allows a user to comfortably use the display in a messy environment such as a kitchen, as the front panel may be removed for cleaning while the display itself remains untouched by dirt or grease. Further, in environments where the display may become scratched or damaged, having a detachable panel to protect the display may extend the life of the display.

In one aspect, a touch-sensitive display device comprises a frame structure, a first panel mounted on the frame structure and configured to display information, a second panel detachably secured to the first panel and configured to cover the first panel, and at least one pressure sensor coupled to the frame structure, the at least one pressure sensor configured to determine a location of a user touch on the second panel.

In another aspect, a method of controlling the operation of an electronic device is disclosed. The method includes the steps of providing a display having a first panel configured to display graphical information and a second transparent panel overlaying the first panel, wherein a set of pressure sensors are configured to detect a user's touch on the second transparent panel, determining when a user touches the second transparent panel, calculating the position of the user's touch on the second transparent panel, and running a program on the electronic device based on the position of the user's touch on the second transparent panel.

In yet another aspect, a touch-sensitive display device comprises a frame structure, a first panel mounted on the frame structure and configured to display information, a second panel detachably secured to the first panel and configured to cover the first panel, means for detachably securing the second panel to the first panel, and means for detecting pressure from a user touch on the second panel.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Display Device Overview

Implementations disclosed herein provide systems, devices, and apparatus for a touch-sensitive display device with a removable transparent panel. For example, in one embodiment, the device may have a frame holding a display screen that is used to display information and media to a user from an attached electronic system. The display panel may be covered by a removable, transparent panel that may be secured to the frame using magnets or other means for holding the panel in place. A plurality of pressure sensors may be attached to each corner of the display such that movement of the transparent panel with respect to the display produces a pressure sensor signal that is analyzed to determine a location of a user's touch and the type of a user command gesture. In some embodiments, the transparent panel is a bezel-less panel.

Figure 1:
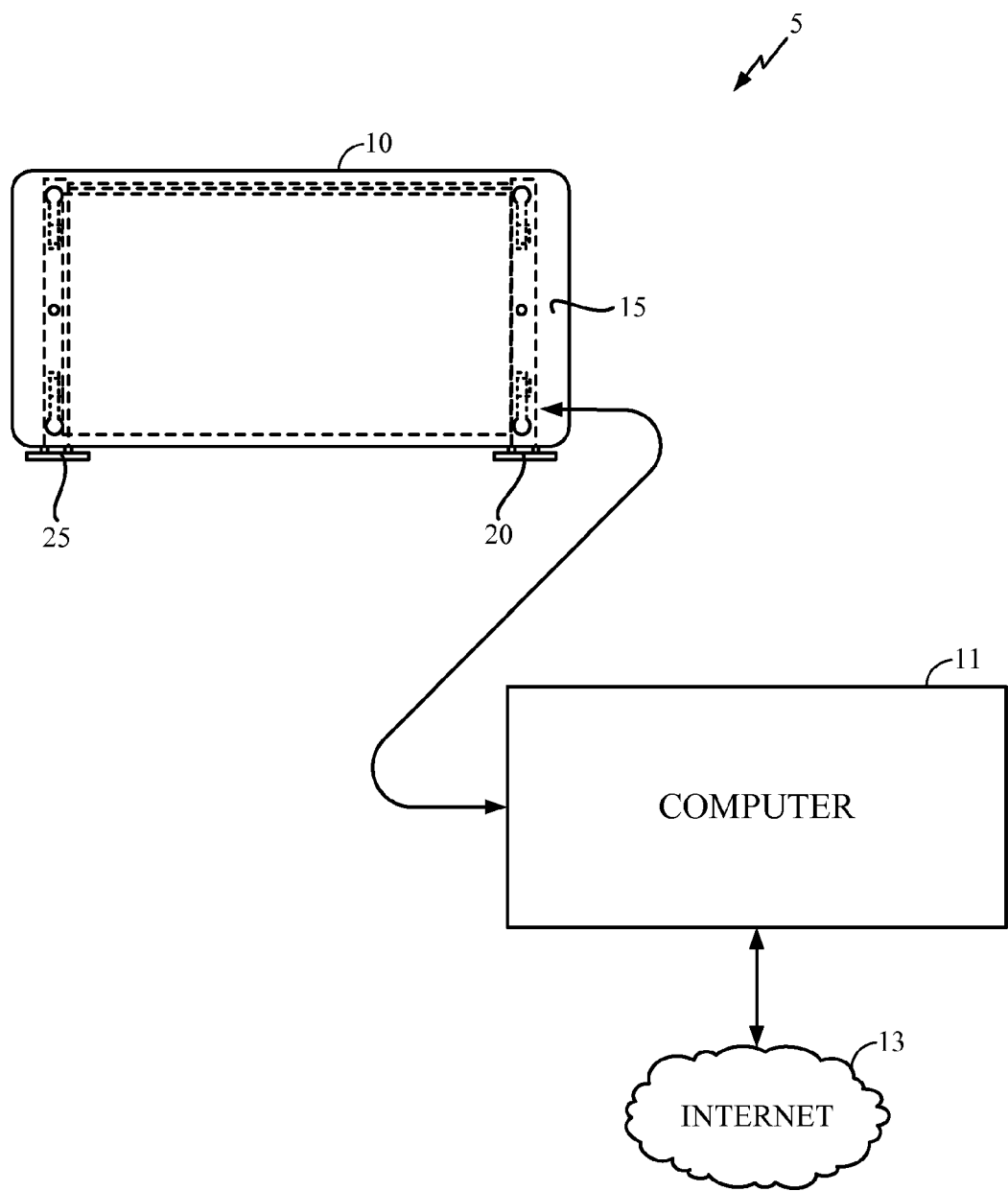
FIG. 1 is a schematic of a touch sensitive display system and apparatus with a detachable front panel, according to one implementation.

FIG. 1 illustrates one embodiment of a touch sensitive display system 5 having a bezel-less, detachable transparent front panel 15 mounted on a frame structure (not shown) that is supported by legs 20, 25. The touch sensitive display system 5 is configured to display information to a user. As shown, the display 10 may be wire or wirelessly connected to a computer 11, such as a laptop, desktop or other processing device that is configured to display content to the user on the display 10. In some embodiments, computer 11 may be integrated into the display 10. The system 5 may also be wire or wirelessly connected to a wide area network 13, such as the Internet, via computer 11, in order to download content to the display 10 and upload user input from the touch sensitive display 10.

Figure 2:
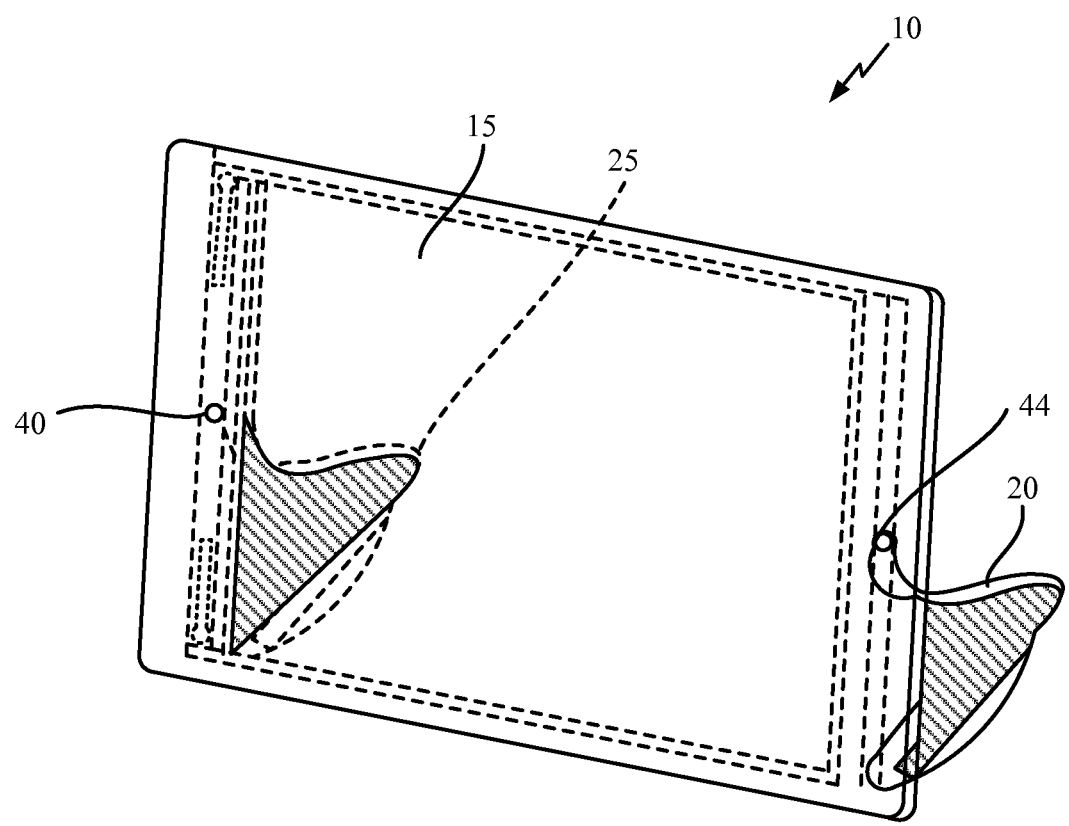
FIG. 2 is a front perspective view of a touch sensitive display device, according to one implementation

FIG. 2 shows a perspective view of one embodiment of the touch sensitive display device 10 with the detachable front panel 15. The display device 10 is supported by a frame 16 which is constructed from two legs 20 and 25 coupled to a transparent back panel (not shown). The legs 20 and 25 may be coupled to the back panel by mechanical fasteners or by a bonding agent such as glue. In some configurations, the legs 20 and 25 and the back panel may be made of acrylic. In such configurations, bonding solvents used for acrylic to acrylic bonding may be used. An active display panel 17 provides the actual display of pixels that displays information to the user from a connected electronic system such as the computer 11, smart phone, or tablet. The active display panel 17 is positioned over the back panel of glass. The active display panel 17 can be any kind of flat panel technology, such as a transparent LCD, AMOLED, or OLED display. In some configurations, the active display panel 17 may be a 22 inch Samsung LTI220MT02 display with the bezel removed.

The transparent front panel 15 may be coupled to the frame 16 such that it entirely covers the active display panel 17. The front panel 15 may be made out of a transparent, high transmittance, nearly tint-free glass, and preferably comprises one substantially flat planar surface with no bezel. For example, in one configuration the front panel 15 may be made of Starphire glass, also known as Eurowhite, Opti White or Diamante, having a length of about 600 mm, height of about 340 mm, and thickness of about 3.3 mm. The front panel 15 may be detachably secured to the display panel 17 by a magnetic coupling between the front panel 15 and the legs 20 and 25 of the frame. This magnetic coupling may include a pair of magnets 40, 44 bonded to the underside of the front panel 15 within shallow grooves having a depth approximately equal to one half the thickness of the magnets 40, 44. The magnets 40, 44 are further configured to mount to matching magnetic holders (not shown) disposed in central positions within each leg 20 and 25. The placement of the magnets 40, 44 within the shallow grooves helps to align the magnets 40, 44 with corresponding magnets disposed in the legs 20, 25 and also helps to remove some load from the bonding agent holding the magnets to the front panel 15. The magnetic coupling of the front panel 15 to the display device 10 may also be achieved through a combination of magnets and a magnetically attractive material. This magnetic coupling allows the front panel 15 to be easily removed from the attached position in front of the active display panel 17 to be washed after use.

Figure 3:
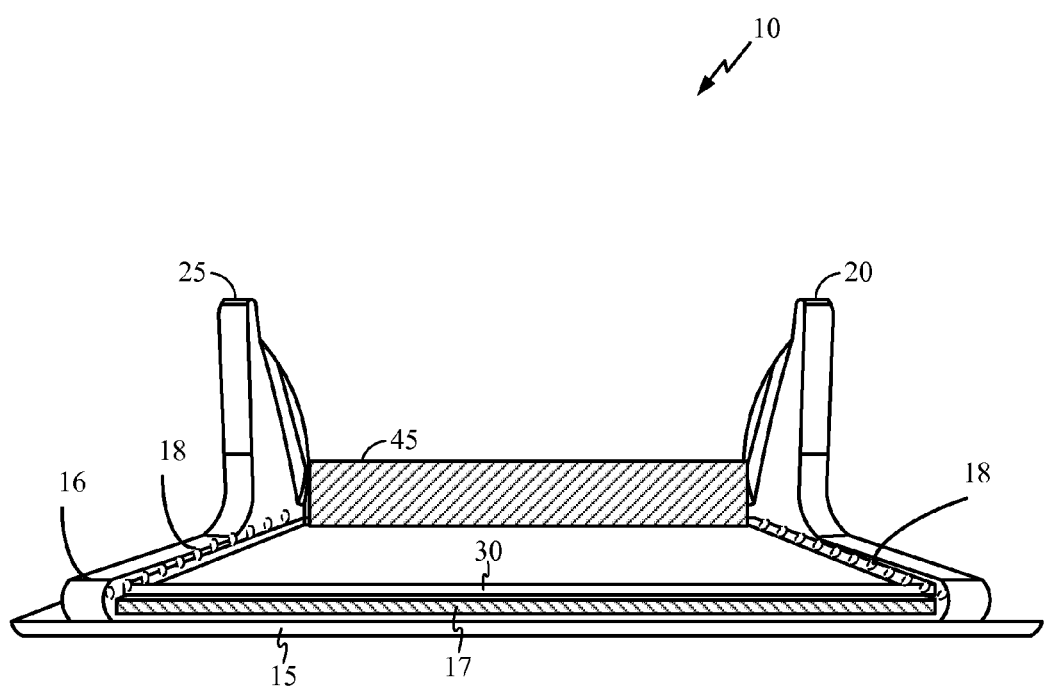
FIG. 3 is a top view of a touch sensitive display device.

As shown in the top view FIG. 3, the front panel 15 is mounted directly adjacent the active display panel 17. The front panel 15 may have a larger width and height than the active display panel 17 and the back panel 30 so that it protrudes to the sides and above the frame 16. In some configurations, labels showing common measuring equivalents such as those used in cooking may be etched on the sides of the front panel 15 to provide useful information to the user. By being placed on the sides of the front panel 15 they may not overlap the active display panel 17 and obstruct a user's view of the information shown on the display. The front panel 15 may be larger than the underlying panels in order to facilitate easy grasping and removal of the front panel 15 for cleaning. In some configurations, the display device 10 has a thickness of approximately 1 inch from the front of front panel 15 to the back of the back panel 30. In other configurations, the display device has a thickness of approximately 20 mm or ⅘ of an inch. In still further configurations, the display device may have a thickness of approximately ½ of an inch.

The legs 20 and 25 may be integrated into the back panel 30 or they may be bonded to the back panel 30. In some configurations, the legs 20 and 25 may be made of Plexiglas Acrylic or other rigid plastic to provide support and stability for the display device 10. The legs 20 and 25 may be approximately one inch in width or they may be other widths sufficient to securely support the weight of the device 10. In some embodiments, the legs 20 and 25 may contain one or more light sources, such as LED strips 18, to provide back lighting for the active display panel 17. In other embodiments, the LED light strips 18 may be secured to the sides of the frame 16. The LED light strips 18 direct, or tunnel, light through the transparent back panel 30 to illuminate the active display panel 17.

The transparent back panel 30 may direct or bend the light from the LED strips 18 located on the legs 20 and 25 forward towards the transparent active display panel 17. In some configurations, the back panel 30 may be made of ACRYLITE® Endlighten T, version OF11L, which appears transparent and evenly redirects light throughout the surface of the back panel 30 to provide illumination for the display 10.

Disposed below the frame 16 is an electronics housing 45 which can be used to house any electronics required for running the display such as the processor to control the active display panel 17, backlight LED strips 18 or other electronic components used within the display 10.

Figure 4A:
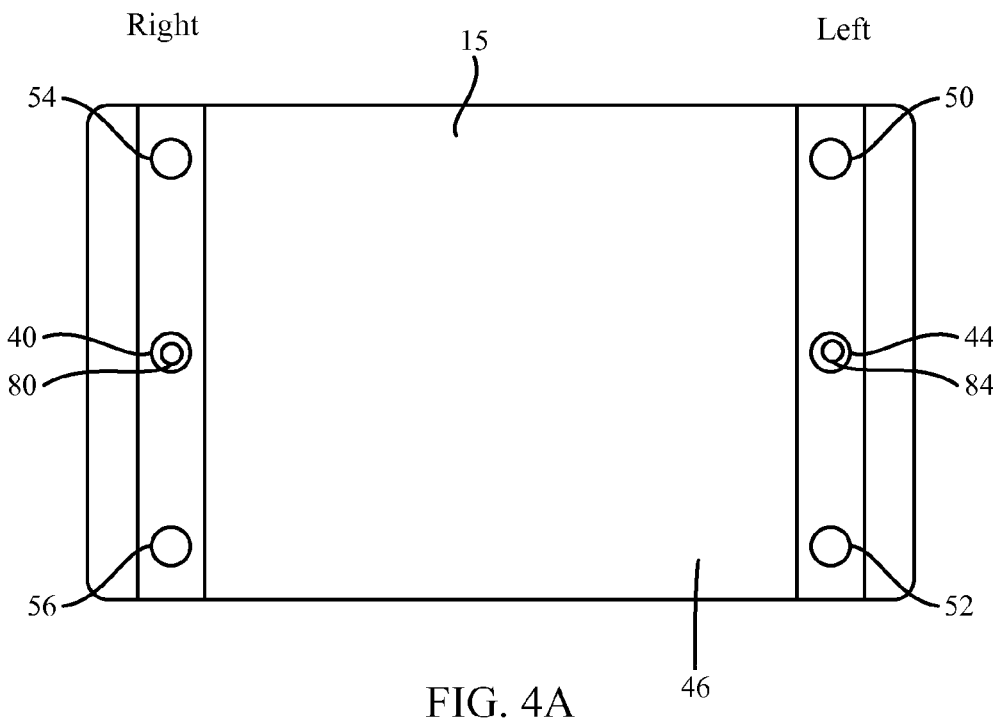
FIG. 4A is a schematic drawing of the underside of a detachable front panel of the touch sensitive display device of FIG. 2.

FIG. 4A schematically illustrates the underside 46 of the detachable front panel 15, that is, the side of the front panel 15 that faces the active display panel 17 when the front panel 15 is attached. The designations "Left" and "Right" in the figures refer to the orientation of the front panel 15 and the display device 10 as viewed by a user with the device 10 fully assembled with the front panel 15 attached. As shown, the front panel 15 may be detachably secured to the display device 10 by a magnetic coupling of two sets of magnet pairs. In other embodiments, more than two sets of magnet pairs may be used to secure the front panel 15 to the display device 10.

As shown in FIG. 4A, two magnets 40 and 44 are adhered to the underside of the front panel 15. The magnets 40 and 44 are preferably bonded to the underside of the front panel 15 but may be secured to the front panel 15 by other adhesion means. As shown in FIG. 4A, the magnets 40 and 44 are located at the approximate midpoint of the height of the front panel 15.

A plurality of high PSI foam members 50, 52, 54, and 56 may be located in each of the four corners of the underside 46 of the front panel 15, as shown in FIG. 4A. User pressure on the front panel 15 of the display 10 will press the high PSI foam members 50, 52, 54, and 56 against corresponding pressure sensors located on the frame 16 of the display to generate a set of pressure signals that indicate a user touch on the front panel 15. In one configuration, the high PSI foam members 50, 52, 54, and 56 may be made of an ultra-strength neoprene rubber material having a durometer of 60 A and tensile strength of 2500 PSI, such as those distributed by McMaster-Carr having the manufacturers' part number 8463K412.

Low PSI foam members 80 and 84 may be bonded to each magnet 40 and 44 on the underside 46 of the front panel 15. The low PSI foam members 80 and 84 may be made of cartilage foam having a lower PSI than the high PSI foam members 50, 52, 54, and 56. In one configuration, the low PSI foam member may be cartilage material such as PORON Urethane Foam manufactured by Rogers Corporation, part number 4701-40-20062-04, having a width of 1.57 mm.

Figure 4B:
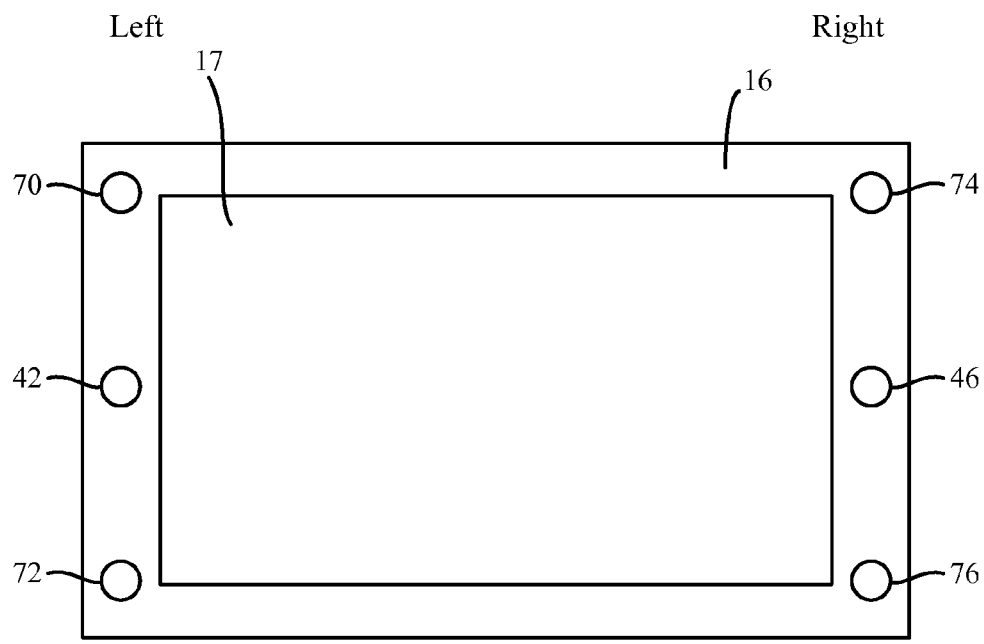
FIG. 4B is a schematic drawing of the display device of FIG. 2 with the front panel detached.

FIG. 4B schematically illustrates the active display panel 17 and the frame 16 of display 10 with the front panel 15 detached. As shown, the frame 16 surrounds all sides of the active display panel 17. In other embodiments, the frame 16 may surround the left and right sides and not the top and bottom of the active display panel 17. As discussed above, the front panel 15 may be detachably secured to the display device 10 by a magnetic coupling of two sets of magnet pairs. As shown in FIG. 4B, two magnets 42 and 46 are adhered to the frame 16 of the display device 10. The magnets 42 and 46 are preferably bonded to the frame 16 of the display device 10 but may be secured by other adhesion means. As shown, the magnets 42 and 46 are located within a central position of the sides of the frame 16. In other embodiments, low PSI foam members 80 and 84 may be secured to the magnets 42 and 46, facing the underside 46 of the front panel 15.

A plurality of pressure sensors 70, 72, 74, and 76 may be located on the legs 20, and 25 (not shown) or on the frame 16 of the display 10, near the four corners of the display panel 17. Movement of the front panel 15 with respect to the display produces a pressure signal that may be analyzed to determine the position of a user's touch and the type of user command gesture. In other embodiments, the high PSI foam members 50, 52, 54, and 56 may be bonded to the outside surface of the pressure sensors 70, 72, 74, and 76 facing the underside of the front panel 15. In one configuration, the pressure sensors 70, 72, 74, and 76 may be single-zone force sensing resistors distributed by Interlink Electronics as part number FSR 402 having a 14.7 mm diameter active area.

When the front panel 15 is detachably secured to the display device 10, the magnets 42 and 46 provide magnetic coupling of the front panel 15 to the display device when matched with the corresponding magnet 40 and 44 on the underside of the front panel 15. For example, the magnets 40, 42, 44, and 46 are oriented such that magnets 42 and 44 are magnetically attracted and magnets 40 and 46 are magnetically attracted to provide a magnetic coupling to attach the front panel 15 to the display device 10.

In other embodiments the magnet pairs may be located closer to the top or the bottom of the legs 20 and 25 of the frame 16 of the display device 10. In one configuration, the magnets may be Neodymium Disc Magnets, product number D91-N52 distributed by K&J Magnets having an attach force of 4.5 lbs. Depending on the weight of the front panel 15, magnets of varying strength or more than one set of magnets per side may be required.

The magnets 40, 42, 44, and 46 are configured to secure the front panel 15 to the display device 10 such that a small gap exists between the front panel 15 and the active display panel 17. The small gap between the front panel 15 and the active display panel 17 allows the front panel 15 to move with respect to the display panel 17 and the pressure sensors 70, 72, 74, and 76. Therefore, user pressure on the front panel 15 initiates movement of the front panel 15 which causes the high PSI foam members 50, 52, 54, and 56 to apply pressure to the corresponding pressure sensors 70, 72, 74, and 76 with varying amounts of force. The gap between the front panel 15 and the active display panel 17 also helps to prevent scratching the active display surface 17 should there be foreign material or debris on the underside of the front panel 15. The gap further helps to prevent scratches on the active display panel 17 due to general removal and placement of the front panel 15 by the user. In some configurations, the gap between the front panel 15 and the active display panel 17 may be about 3 mm. In other configurations, the gap between the front panel 15 and the active display panel may be about 2 mm or smaller.

The low PSI foam members 80 and 84 secured to one magnet of each magnet pair enable the front panel 15 to tilt and/or move toward the display panel 17 in a compressive reaction to a user touch and cushion the movement of the front panel 15 with respect to the display panel 17. The low PSI foam members 80 and 84 also act as springs to enable the front panel 15 to return to a neutral position with respect to the pressure sensors 70, 72, 74, and 76 after the release of a user's touch on the front panel 15. The low PSI foam members 80 and 84 may be bonded to either magnet of the magnet pairs that attach the front panel 15 to the display device 10. In one configuration, low PSI foam member 80 may overlay and be bonded to magnet 40 and low PSI foam member 84 may overlay and be bonded to magnet 44 on the underside of the front panel 15. In other configurations, the low PSI foam member 80 may be bonded to magnet 42 and low PSI foam member 84 may be bonded to magnet 46 positioned near the center of the legs 20 and 25 of the display device 10.

When the front panel 15 is attached to the display 15, the high PSI foam members 50, 52, 54, and 56 are aligned with the corresponding pressure sensors 70, 72, 74, and 76. User pressure on the front panel 15 of the display 10 will press the high PSI foam members 50, 52, 54, and 56 against the corresponding pressure sensors 70, 72, 74, and 76 to generate a pressure signal from each of the four sensors 70, 72, 74, and 76. These signals may be analyzed to determine a location of a user's touch on the front panel 15, as will be discussed in more detail below. The signals may also be analyzed to determine the type of user gesture made and the associated command associated with the user gesture.

As will be discussed in further detail below, a processor receives the signals from the pressure sensors 70, 72, 74, and 76 and associates the pressure signals with a user gesture. The sensors are configured to be able to determine the location of pressure from a user touch on the front panel based on relative pressure differentials between the sensors. The pressure sensors 70, 72, 74, and 76 represent one means for receiving user input on the front panel 15 of the touch sensitive display device 10.

Figure 5:
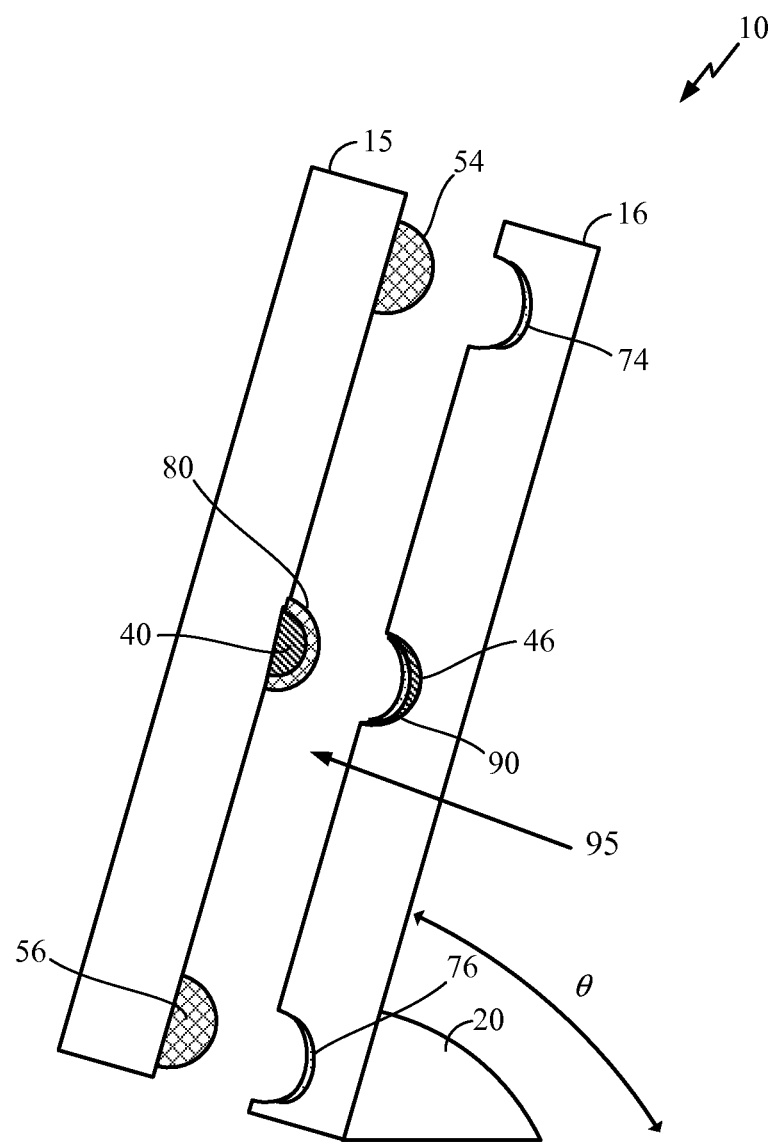
FIG. 5 is a schematic cross sectional view of the display device of FIG. 2.

A cross sectional view of the display device 10 is shown in FIG. 5. This view shows a cross section through the magnets and pressure sensors located on the right side of the display device 10. In this figure, magnets 40 and 46 are paired to secure the front panel 15 to the display device 10. The low PSI foam member 80 is sandwiched between the magnets 40 and 46 to act a spring to return the front panel 15 to a neutral position after the release of pressure from a user's touch. FIG. 5 depicts one low PSI foam member 80; however, the corresponding foam member 84 (not shown) is located on the opposite side (the left side) of the display 10.

In some embodiments, a high friction material such as sand paper may be provided between the magnets of each pair to hold the front panel 15 securely to the display device 10 with minimal or no slipping. In some configurations, the high friction film or sand paper may be secured between the magnet attached to the frame or leg and the low PSI foam member attached to the magnet secured to the underside 46 of the front panel 15. This high friction film prevents the frontal glass from sliding down or from side to side. As shown in FIG. 5, a high friction film member 90 is further sandwiched between the magnets 40 and 46 to minimize downward or side to side slippage of the front panel 15. In some configurations, the high friction material may be sandpaper such as Norton Tufbak Gold T481 having 220 A-WT. This high friction material may stand up to repeated washings over time as the front panel 15 is washed. In addition, this material is rough enough to grip the low PSI foam member without ripping the foam member.

Correspondingly, on the other side of the display (not shown), magnets 42 and 44 are paired help hold the front panel 15 to the display device 10, with low PSI foam member 84 and a second high friction film member 90 sandwiched between the magnets 42 and 44. The low PSI foam members 80 and 84 act as grip surfaces for the high friction material 90 to "bite" into as the magnets 40, 42, 44, and 46 compress the foam and film.

A gap 95 between the front panel 15 and the frame 16 may be seen more clearly in FIG. 5. The gap 95 allows the front panel 15 to move with respect to the frame 16 and active display panel 17 in response to the pressure from a user's touch.

The high PSI foam members 54 and 56 are aligned with the pressure sensors 74 and 76, as shown in FIG. 5. The movement of the front panel 15 with respect to the display 10 will press the high PSI foam member against the corresponding pressure sensor, and trigger a pressure signal from each pressure sensor. Movement of the front panel 15 may cause the high PSI foam member to press against the corresponding pressure sensor or may cause the high PSI foam member to release from the corresponding pressure sensor.

For example, when a user touches the top right quadrant of the display, the top right corner of the front panel 15 will move towards the frame 16, pressing high PSI foam member 54 against the pressure sensor 74. The rigidity of the front panel 15 will cause the lower right corner of the front panel 15 to lift away from the frame 16. Movement of the front panel 15 in response to pressure from a user's touch will result in different responses from the pressure sensors on each side of the display 10. These responses may be analyzed to determine a location of the user's touch on the front panel 15 and may be correlated to a specific application or window active at the position of the user's touch in order to perform the desired command within the user-selected application.

FIG. 5 further illustrates a leg 20 that may be secured to the back panel 30 or may be formed from one continuous construction with the back panel 30. Correspondingly, on the other side of the display 10 (not shown), leg 25 may be secured to the back panel 30. In other embodiments, leg 25 and back panel 30 may also be formed from one piece The legs 20 and 25 of the display device 10 may be angled with respect to the front panel 15, active display panel 17 and back glass 30 such that the device 10 provides a suitable viewing angle for a user standing in front of the device. The tilt angle $\theta$ of the display 10 may be optimized such that the information shown on the display 10 is visible by a user standing close to the device or a user standing about 5 to 10 feet from the device. In some configurations, the optimum tilt angle for the display is 60 degrees based on a user's average height (approximately 175 cm) and the average height of kitchen counter surfaces (approximately 92 cm). In some embodiments, the user's line of sight forms a 90 degree angle with the tangent of the front panel 15.

Because the pressure sensors 70, 72, 74, and 76 are coupled to the frame, there is no need for wires coming out of the front panel 15 as there are in known capacitive or resistive sensing devices, enabling the front glass panel 15 to be easily detached and washed.

System Overview

Figure 6:
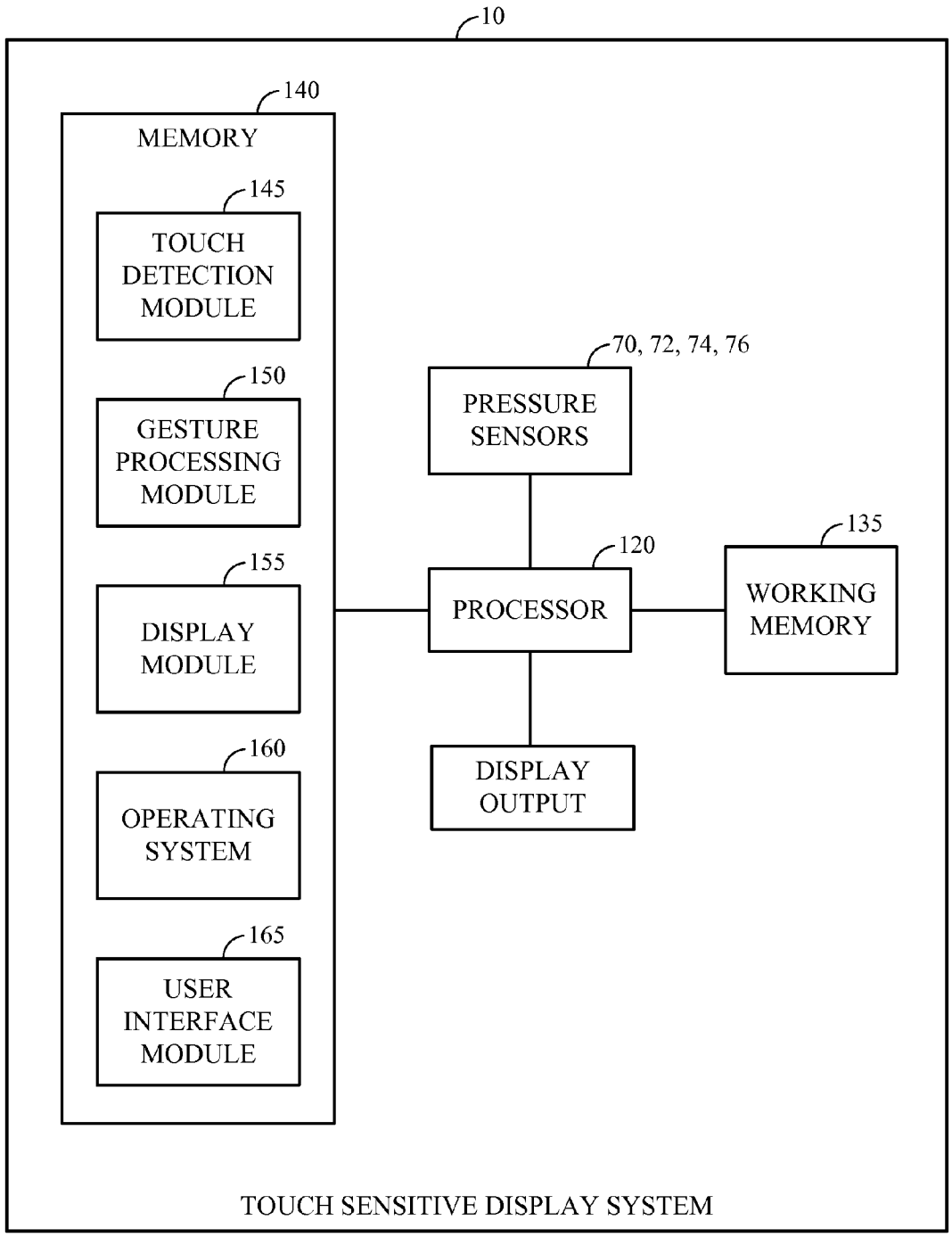
FIG. 6 is a schematic block diagram depicting a touch sensitive display system implementing some operative elements.

A high-level block diagram of one embodiment of a touch sensitive display system 10 is shown in FIG. 6. The touch sensitive display system 10 may be incorporated into the electronics housing 45 to control the functions of the display such as active display panel 17, backlight LED strips 18 or other electronic components used within the display 10. As shown, the system 10 has a set of components including a processor 120 linked to a plurality of pressure sensors 70, 72, 74, and 76 and a display output. A working memory 135 and memory 140 are also in communication with processor 120. The touch sensitive display system 10 may also connect to a computer 11 in order to provide additional applications and functions for the display, such as word processing, video and audio functions, or interactive browsing via the Internet.

Touch sensitive display system 10 may be a stationary device such as a display built into a kitchen cabinet unit, refrigerator, or other appliance or it may be a standalone display unit. A plurality of applications may be available to the user on touch sensitive display system 10 via computer 11. These applications may include but are not limited to calendar viewing and editing functions, word processing functions, recipe editing and viewing functions, video and imaging display functions, and internet browsing functions.

Processor 120 may be a general purpose processing unit or a processor specially designed for display applications. As shown, the processor 120 is connected to a memory 140 and a working memory 135. In the illustrated embodiment, the memory 140 stores a touch detection module 145, a gesture processing module 150, a display module 155, operating system 160, and user interface module 165. These modules may include instructions that configure the processor 120 to perform various display, touch sensing, and gesture processing functions and device management tasks. Working memory 135 may be used by processor 120 to store a working set of processor instructions contained in the modules of memory 140. Alternatively, working memory 135 may also be used by processor 120 to store dynamic data created during the operation of touch sensitive display system 10.

As mentioned above, the processor 120 is configured by several modules stored in the memory 140. Touch detection module 145 includes instructions that configure the processor 120 to detect a user's touch on the front panel 15 of the display 10 by analyzing the signals received from the pressure sensors 70, 72, 74, and 76. Therefore, processor 120, along with touch detection module 145 and pressure sensors 70, 72, 74, and 76 represent one means for detecting a user's touch on the front panel 15 of the display device 10.

The gesture processing module 150 provides instructions that configure the processor 120 to process the pressure sensor data to determine the intended meaning of the touch and/or gesture. Therefore, processor 120, along with touch detection module 145, pressure sensors 70, 72, 74, and 76, and gesture processing module 150 represent one means for determining the intended meaning of a user's touch.

The user interface module 165 includes instructions that configure the processor 120 to display information on the active display panel 17 of the display device 10.

Operating system 160 configures the processor 120 to manage the memory and processing resources of system 10. For example, operating system 160 may include device drivers to manage hardware resources such as the display output or pressure sensors 70, 72, 74, and 76. Therefore, in some embodiments, instructions contained in the touch sensitive display system modules discussed above may not interact with these hardware resources directly, but instead interact through standard subroutines or APIs located in operating system component 160. Instructions within operating system 160 may then interact directly with these hardware components.

Although FIG. 6 depicts a device comprising separate components to include a processor, a plurality of pressure sensors, electronic display output, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 6 illustrates two memory components, including memory component 140 comprising several modules and a separate memory 135 comprising a working memory, one with skill in the art would recognize several embodiments utilizing different memory architectures. For example, a design may utilize ROM or static RAM memory for the storage of processor instructions implementing the modules contained in memory 140. Alternatively, processor instructions may be read at system startup from a disk storage device that is integrated into touch sensitive display system 10 or connected via an external device port. The processor instructions may then be loaded into RAM to facilitate execution by the processor. For example, working memory 135 may be a RAM memory, with instructions loaded into working memory 135 before execution by the processor 120.

Touch Detection and Gesture Processing Overview

Figure 7:
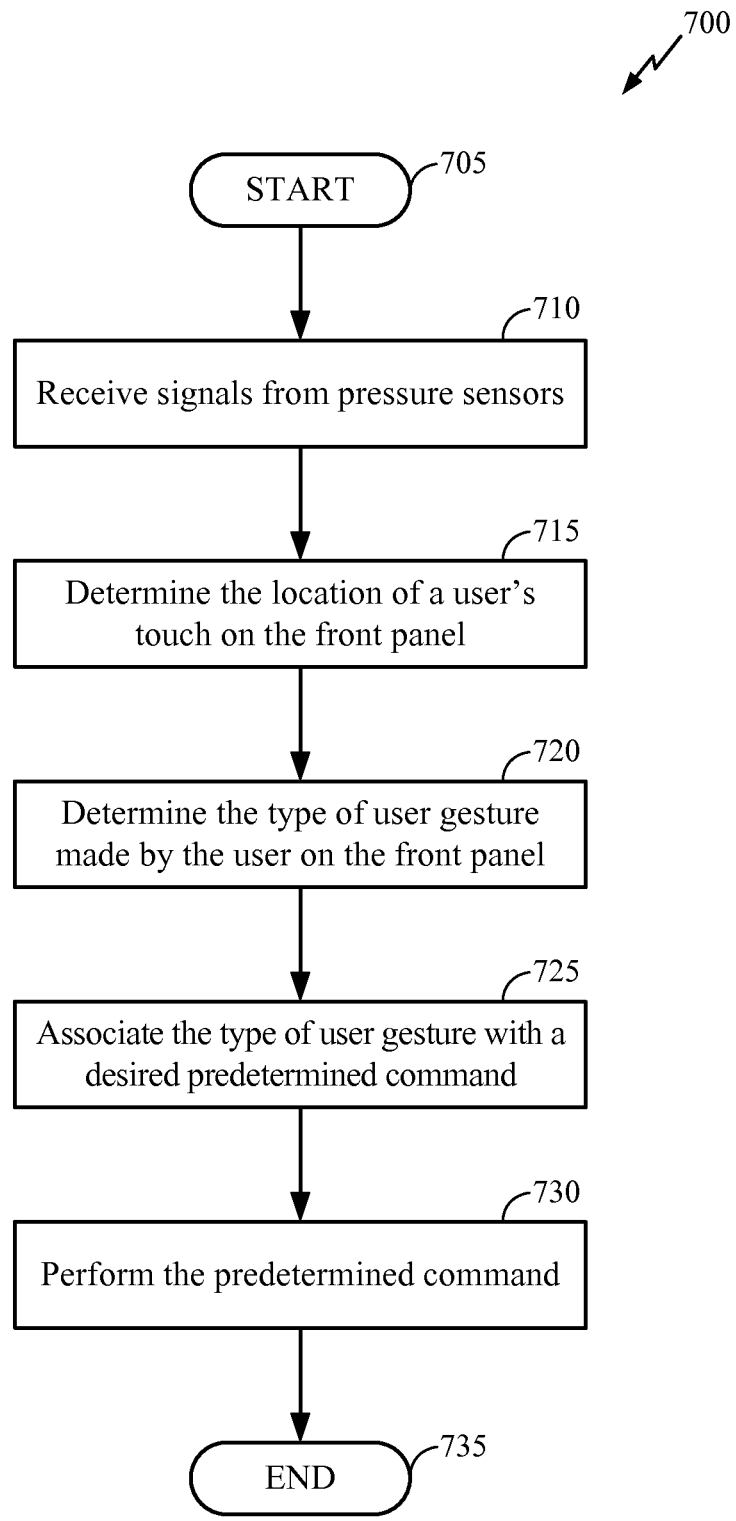
FIG. 7 is a flow chart illustrating a touch sensing and gesture processing process, according to one implementation.

FIG. 7 is a flow chart depicting a high-level overview of a touch sensing and gesture processing process that may be implemented in several modules depicted in FIG. 6. Process 700 may be used in some embodiments to detect a user's touch on the front panel 15 of the display device 10 when the front panel 15 is secured to the device. The process 700 begins at start block 705 and then moves to a block 710, wherein the processor receives signals from the pressure sensors indicating a user's touch on the front panel 15. Depending on the position of the user's touch on the front panel 15, the signals from the pressure sensors 70, 72, 74, and 76 will vary. The user's touch on the front panel 15 causes the front panel 15 to deflect toward the active display panel 17 attached to the frame 16 of the display 10. This deflection in turn causes the pressure sensors 70, 72, 74, and 76 to be engaged to varying degrees by the corresponding high PSI foam members 50, 52, 54, and 56. The insertion of the low PSI foam members 80 and 84 between each of the magnet pairs that secure the front panel 15 to the display device 10, along with the small gap 95 between the front panel 15 and the active display panel 17, allow the front panel 15 to deflect up and down. The position of a user's touch on either side of a center line passing vertically through the center of a the display device 10 also causes the front panel 15 to deflect more to one side than the other, therefore causing a greater pressure signal response in the pressure sensor located closer to the area of the user's touch on the front panel 15. Similarly, a user's touch on any of the four quadrants of the front panel 15 will cause a higher pressure sensor response from the sensor closest to the area of the user's touch.

Once the processor 120 has received signals from the pressure sensors 70, 72, 74, and 76 indicating a user's touch on the front panel 15, process 700 transitions to block 715 wherein the location of the user's touch on the front panel 15 is determined. For each user touch or gesture, the duration of the touch, the direction or path of any movement of the touch, and any acceleration of movement of the touch may be determined. The location of the user's touch may be determined from the magnitude of the pressure signals received by the processor and the known locations and distances between each of the plurality of pressure sensors 70, 72, 74, and 76.

The position of a user's touch may be calculated using several methods, including center of gravity calculation method, neural network training method, and fuzzy expert system method. All of the above methods share a similar processing framework.

First, since the resistance of the pressure sensors changes as the pressure of the user's touch varies, an analog to digital converter placed within the system converts the analog pressure signal into a digital format for processing by the processor. Next, since touch sensing is a relatively slow process as compared to processing speed, subsampling is used to acquire a stream of data from the pressure sensors. In one example, a 20 msec sampling rate may be used.

Next, band pass filtering may be applied to the pressure signals. Generally, there are two types of noise that need to be removed from the pressure signal. The high pass filtering component of the band pass filter is used to remove pressure sensor drift, which occurs when the reference value for a "no touch" event drifts over time. This drift may occur depending on the type and technology of pressure sensor used. Low pass filtering may also be required to remove fluctuations in the pressure signal at the time of a user pressing on the front panel and immediately after this occurs until the pressure signal stabilizes. This low pass filtering is done to obtain a specific single pressure numeric value for each pressure signal reflecting the pressure applied when the user presses on the front panel.

Finally, location of a user's touch on the front panel may be performed, in some embodiments, using one of the three methods listed above. In this calculation, all of the pressure sensor signals are processed to determine a single location on the screen where the user touch event occurred.

One method for determining the location of a user's touch is the center of gravity method. In this approach, the pressure delta from a rest, or no touch, position is captured for each sensor. The pressure delta is the "gravitational pull" the pressure sensor has relative to the center of gravity, which is defined as the calculated location of a user's touch. The location of touch on the front panel may be calculated by weighing each of these "gravitational pulls" from each of the pressure sensors. The weight of the front panel may be dispersed among the pressure sensors depending on the tilt angle of the front panel and this weight may be factored into the calculation of the location of the user's touch.

In another method, the location of a user's touch may be calculated using a neural network training method. In this approach, a training set is constructed and used to train a neural network to identify the location of each sample press in the training set. After the training phase, a verification phase on a second sample set is done to test the accuracy of the neural network. When the accuracy is above a threshold accuracy value, the trained neural network is deployed in the system to determine the real-time location of a user's touch.

In another method, the location of a user's touch may be calculated using a fuzzy expert system. In this approach, a fuzzy rule base system is designed to describe key mapping between pressure values and press event locations. The resulting system is then tested for accuracy by touching any random location on the front panel. If the accuracy of the tested location is not above a threshold value, additional key rules are determined and added to the fuzzy rule base system. This process is repeated iteratively until the required detection accuracy is achieved. Once satisfactory accuracy results are achieved, the system may be used to determine the real-time location of a user's touch.

After determining the location of a user's touch on the front panel, process 700 transitions to block 720 wherein the type of user gesture made by the user on the front panel is determined. The type of user gesture may be determined from a library or catalog of user gestures contained within a memory unit. The user's gesture may be may be determined by monitoring the movement of the user's touch over time.

Once the type of user gesture has been determined, process 700 transitions to block 725 wherein the user gesture is associated with a desired predetermined command. For example, the user could perform a swipe action at one location on the front panel 15 and the system 10 would associate the performed action with moving an object on the active display panel 17. Other actions are also possible, such as opening or closing an application, running a program, resizing an object, and selecting an object, among other actions.

After associating the type of user gesture with a desired predetermined command, process 700 transitions to block 730 wherein the system 10 performs the predetermined command. As discussed in the above example, the system 10 may open or close an application, resize an object, or select an object, among other actions, in response to a gesture associated with a predetermined command. Once the predetermined command has been executed, process 700 transitions to block 735 and ends.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A touch-sensitive display device, comprising:
    a frame structure;
    a first panel mounted on the frame structure and configured to display information;
    a second panel detachably secured to the frame structure with at least one magnet and configured to cover the first panel; and
    at least one pressure sensor coupled to the frame structure and configured to determine a location of a user touch on the second panel,
    wherein the second panel is configured to move relative to the frame structure in response to the user touch on the second panel.

2. The display of claim 1, wherein the frame structure further comprises at least two legs mechanically attached to a third panel mounted behind and adjacent to the first panel.

3. The display of claim 1 further comprising light strips that provide back lighting to the first panel.

4. The display of claim 3, wherein the light strips are mounted on a left side and a right side of the first panel.

5. The display of claim 4, wherein the light strips are contained within the frame structure.

6. The display of claim 4, wherein the light strips are LED light strips.

7. The display of claim 1, wherein the first panel comprises a transparent LCD screen.

8. The display of claim 1, wherein the second panel comprises bezel-less transparent glass.

9. The display of claim 1, wherein the second panel is detachably secured to the first panel by a plurality of magnets.

10. The display of claim 9, wherein the magnets are configured as two sets of magnet pairs mounted at approximately the center of each side of the second panel such that a first magnet of each set of the magnet pairs is mounted in a recess on the second panel and a second magnet of each set of the magnet pairs is mounted on the frame structure.

11. The display of claim 10, wherein a cushioning member is securably attached to one magnet of each set of the magnet pairs.

12. The display of claim 11, wherein the cushioning member is configured to allow a space between the first panel and the second panel such that the second panel may move relative to the first panel in response to pressure from user's finger or hand.

13. The display of claim 12, wherein the cushioning member is a low psi urethane foam.

14. The display of claim 1, wherein the at least one pressure sensor comprises four pressure sensors mounted on each corner of the frame structure.

15. The display of claim 14 further comprising a pressuring foam member secured to each pressure sensor.

16. The display of claim 1 further comprising a control module configured to detect input from the pressure sensors and determine the position of a user's touch on the first panel.

17. The display of claim 16, wherein the control module is further configured to query a memory for a user command associated with the user's touch.

18. A touch-sensitive display device, comprising:
a frame structure;
a first panel mounted on the frame structure and configured to display information;
a second panel detachably magnetically secured to the frame structure and configured to cover the first panel; and
means for detecting pressure from a user touch on the second panel,
wherein the second panel is configured to move relative to the frame structure in response to the user touch on the second panel.

19. The touch-sensitive display device of claim 18, wherein the second panel is detachably magnetically secured to the frame structure with at least one magnet mounted in a recess on the second panel and a magnetically attractive material mounted on the frame structure.

20. The touch-sensitive display device of claim 18, wherein the means for detecting pressure comprises at least one electronic pressure sensor mounted in the frame structure.

* * * * *